US012280942B2

(12) United States Patent
Donner

(10) Patent No.: US 12,280,942 B2
(45) Date of Patent: Apr. 22, 2025

(54) BAG, IN PARTICULAR PLASTICS BAG, FOR USED COFFEE CAPSULES, METHOD FOR COLLECTING AND RECYCLING USED COFFEE CAPSULES AND USE OF SUCH BAGS FOR COLLECTION AND SHIPPING OF USED COFFEE CAPSULES

(71) Applicant: Mettler Packaging LLC, Raynham, MA (US)

(72) Inventor: Rene Donner, Morbach (DE)

(73) Assignee: Mettler Packaging LLC, Raynham, MA (US)

( * ) Notice: Subject to any disclaimer, the term of this patent is extended or adjusted under 35 U.S.C. 154(b) by 721 days.

(21) Appl. No.: 17/226,972

(22) Filed: Apr. 9, 2021

(65) Prior Publication Data

US 2021/0316943 A1 Oct. 14, 2021

(30) Foreign Application Priority Data

Apr. 9, 2020 (EP) .................................... 20169082

(51) Int. Cl.
*B65F 1/00* (2006.01)
*B09B 3/40* (2022.01)
(Continued)

(52) U.S. Cl.
CPC .............. *B65F 1/0006* (2013.01); *B09B 3/40* (2022.01); *B65B 5/067* (2013.01); *B65B 7/06* (2013.01);
(Continued)

(58) Field of Classification Search
CPC .. B65F 1/0006; B65F 2210/167; B65D 33/08; B65D 33/18
(Continued)

(56) References Cited

U.S. PATENT DOCUMENTS 3,224,640 A * 12/1965 Schneider .............. B65D 31/12 383/88
4,417,658 A * 11/1983 Gardner .................... A61L 2/26 383/66
(Continued)

FOREIGN PATENT DOCUMENTS

DE 10 2016 005 649 A1 11/2017
EP 3 617 085 A1 3/2020
(Continued)

OTHER PUBLICATIONS

European Search Report for EP Application No. 20169082.3 dated Nov. 30, 2020, 15 pgs.
(Continued)

*Primary Examiner* — Peter N Helvey
(74) *Attorney, Agent, or Firm* — Seed IP Law Group LLP

(57) ABSTRACT

A bag, preferably a plastics bag, for the collection of waste, which may include damp waste such as used coffee capsules, wherein, a bag opening is present in the bag front wall, and further comprising a closing flap which has an adhesion area to cover and close the bag opening. The disclosure further relates to a method for collecting waste, which may include damp waste such as used coffee capsules, using the bag according to the disclosure. Moreover, a method for recycling used coffee capsules, comprising collecting a plurality of bags according to the disclosure filled therewith and subjecting this plurality of bags to a melting process. Finally, described herein is use of the bags according to the disclosure for the collection of waste, which may include damp waste such as used coffee capsules, or for the shipping of waste such as used coffee capsules to a collection point.

19 Claims, 6 Drawing Sheets

(51) Int. Cl.
*B65B 5/06* (2006.01)
*B65B 7/06* (2006.01)
*B65D 33/08* (2006.01)
*B65D 33/18* (2006.01)

(52) U.S. Cl.
CPC ............. *B65D 33/08* (2013.01); *B65D 33/18* (2013.01); *B65F 2210/167* (2013.01)

(58) Field of Classification Search
USPC ............................................................ 383/86
See application file for complete search history.

(56) References Cited

U.S. PATENT DOCUMENTS

| | | | | | |
|---|---|---|---|---|---|
| 4,509,196 | A * | 4/1985 | Sak | B65D 33/20 | 283/109 |
| 4,786,190 | A * | 11/1988 | Van Erden | B65D 75/20 | 383/203 |
| 5,056,930 | A * | 10/1991 | Mestetsky | B65D 33/20 | 383/88 |
| 5,135,313 | A * | 8/1992 | Bowman | B65D 33/34 | 383/62 |
| 5,167,455 | A * | 12/1992 | Forman | B65D 33/20 | 383/211 |
| 5,205,649 | A * | 4/1993 | Fullerton | B65D 33/34 | 383/5 |
| 5,287,960 | A * | 2/1994 | Kalb | A61G 9/00 | 206/440 |
| 5,908,243 | A * | 6/1999 | Hanning | B65D 33/004 | 383/62 |
| 6,196,716 | B1 * | 3/2001 | Geyer | B65D 33/34 | 383/42 |
| 6,461,044 | B1 * | 10/2002 | Anderson | B65D 33/20 | 383/211 |
| 6,913,388 | B2 * | 7/2005 | Laske | B65D 33/20 | 383/88 |
| 8,162,146 | B2 * | 4/2012 | Sherrill | A61F 15/001 | 383/66 |
| 11,319,115 | B2 * | 5/2022 | Yang | B65D 81/2038 | |
| 11,820,556 | B2 * | 11/2023 | Klaassen | B65D 79/005 | |
| 2004/0146226 | A1 * | 7/2004 | Wolak | B32B 27/32 | 383/66 |
| 2008/0152264 | A1 * | 6/2008 | Pokusa | B65D 33/18 | 493/260 |
| 2015/0063728 | A1 * | 3/2015 | Dunkle | B65D 77/38 | 383/207 |
| 2015/0210434 | A1 * | 7/2015 | Miller | B65D 85/60 | 383/41 |
| 2019/0071220 | A1 | 3/2019 | Forman et al. | | |
| 2020/0071072 | A1 | 3/2020 | Eberhard | | |

FOREIGN PATENT DOCUMENTS

| | | | |
|---|---|---|---|
| GB | 2533593 | A | 6/2016 |
| WO | 2011/146616 | A1 | 11/2011 |

OTHER PUBLICATIONS

Examination Report No. 1 for AU2021201978 dated Jul. 21, 2022, 3 pages.
Examination Report No. 2 for AU2021201978 dated Jul. 5, 2023, 4 pages.
Examination Report No. 3 for AU2021201978 dated Jul. 21, 2023, 3 pages.

* cited by examiner

BAG, IN PARTICULAR PLASTICS BAG, FOR USED COFFEE CAPSULES, METHOD FOR COLLECTING AND RECYCLING USED COFFEE CAPSULES AND USE OF SUCH BAGS FOR COLLECTION AND SHIPPING OF USED COFFEE CAPSULES

BACKGROUND

Technical Field

The present disclosure relates to a bag, in some cases a plastics bag, expediently for the collection and optionally shipping of, in some cases damp, waste, and highly expediently of used coffee capsules or aluminum coffee capsules. The disclosure further relates to a method for collecting, in some cases damp, waste, and highly expediently damp general cargo waste. The disclosure also relates to a method for recycling used coffee capsules, in some cases used aluminum coffee capsules. Finally, the disclosure relates to use of the bags, in some cases plastics bags, according to the disclosure for the collection and shipping of, in some cases damp, waste, and highly expediently of used coffee capsules or aluminum coffee capsules.

Description of the Related Art

Coffee capsules are a single-use product. They are regularly used in so-called single-serve coffee machines. In order to brew the coffee present in the capsules, heated water or heated steam is passed at high pressure for a predetermined time interval through the coffee powder, partially destroying the capsule present in the coffee machine. The quantity of coffee powder present in the coffee capsule is intended for brewing an individual cup of coffee. A capsule is consequently a single-serve package. Coffee capsules are constantly increasing in popularity due to their ease of handling. A further advantage of this mode of coffee production is the ability to have a wide range of different types of coffee available without having to store relatively large quantities of coffee or coffee beans corresponding to each coffee taste note. To be able to ensure that the coffee powder used for this purpose is fresh and in good condition, the coffee capsules used are regularly made of an aluminum cup body and an aluminum lid. After removal of the used coffee capsule from the automatic coffee maker, said capsule regularly contains both residual water and damp coffee grounds.

If not used, for example, in cafes or coffee shops, the used coffee capsules are frequently disposed of with the regular household garbage and thus evade waste recycling. It has been estimated that, in 2014, the amount of garbage derived from used coffee capsules in Germany alone amounted to 4000 to 4500 tons. While it should be straightforwardly possible to include aluminum coffee capsules in the recycling process through segregated collection when such aluminum capsules are used in cafes and separately collected, it is more difficult with aluminum capsules taken home by the end consumer and used at home. Due to the dampness and contamination with coffee residues or damp coffee grounds, they cannot be collected with the rest of the recycling waste without further post-processing, but rather would have firstly to be separately cleaned by the consumer. This individual cleaning is disadvantageous, not least because of the associated water consumption. This also leads to used coffee capsules finding their way into the regular household garbage.

Since, apart from an inner plastics coating which is regularly present, aluminum coffee capsules, as described above, consist substantially wholly of aluminum and are thus present in virtually segregated form, it would be desirable to make used coffee capsules of aluminum accessible to a recycling process to the greatest possible extent. To this end, EP 3 617 085 A1 proposes a shipping bag in which the opening edge of the front wall is below the opening edge of the rear wall, such that the rear wall forms a protruding, fold-down closing flap with a first adhesive strip and wherein the front wall comprises a third adhesive strip on the outer side beyond the area of overlap with the folded-down closing flap. Alternatively or in addition to the first adhesive strip, the front wall may have a second adhesive strip on the outer side in the area of overlap with the closing flap folded down along the opening edge of the front wall. These bags are intended to provide liquid-tight return shipping.

BRIEF SUMMARY

Nonetheless, it is desirable to be able to access containers that can be still more reliably fluid-tightly filled and fluid-tightly stored and transported. The present disclosure therefore takes into account the desire to supply used coffee capsules, in some cases aluminum coffee capsules, simply and still more reliably and to the greatest possible extent to a recycling process.

Accordingly, the present disclosure provides a bag, in some cases a plastics bag, comprising:

- a bag front wall with an inner side and an outer side as well as a bottom edge and mutually opposing side edges; and
- a bag rear wall with an inner side and an outer side as well as a bottom edge and mutually opposing side edges,
- wherein the bag front wall and the bag rear wall are joined together in the region of their side edges and bottom edges at least in sections directly or via side walls and/or side folds and/or a bottom fold;
- a lower bag end closed when used as stated, in some cases in the region of the bottom edges of the bag front wall and the bag rear wall, comprising a bag bottom;
- a closed upper bag portion opposite the bag bottom,
- wherein at a closer distance from the closed upper bag portion than from the lower bag end, a bag opening is present in one portion of the bag front wall, said bag opening expediently extending in the direction from the one side edge to the opposing side edge, and
- wherein the closed upper bag portion is formed by:
  - a first weld or adhesive bond area, in some cases by a first weld seam, which joins the bag front wall and the bag rear wall, in some cases the inner sides thereof, and which extends respectively from the one side edge as far as the opposing side edge; or
  - an expediently integral, highly expediently one-piece, transition from the bag rear wall to the bag front wall, expediently in the form of a turnover fold; and
- further comprising a first material strip, in some cases a plastics material strip, forming a closing flap, with an inner side and an outer side and with an upper edge portion, a lower edge portion, and mutually opposing side edges,
- wherein the closing flap has an adhesion area, in some cases an adhesive strip, in some cases on the inner side, and
- wherein the adhesion area is designed and configured, in some cases when the closing flap is placed flat onto the outer side of the bag front wall, to cover the bag opening, wherein at the same time the adhesion area and/or the lower edge portion of the closing flap expediently extend(s) to the other side of the bag opening.

These bags, in some cases plastics bags, are provided and suitable in some cases for the collection and optionally shipping of, in some cases damp, waste, highly expediently for the collection and optionally shipping of used coffee capsules or aluminum coffee capsules.

Bags according to the present disclosure, in some cases plastics bags, which are highly suitable are those in which the closing flap is joined along the upper edge portion in the region of the upper bag portion above the bag opening to the bag front wall, in some cases the outer side thereof, along a second weld or adhesive bond area, in some cases a second weld seam. In this case, the second weld or adhesive bond area, in some cases the second weld seam, may conveniently extend from the one side edge as far as the opposing side edge of the closing flap. In this way, a high degree of tightness can be ensured with expediently little manufacturing effort. The first weld or adhesive bond area and the second weld or adhesive bond area extend preferably substantially congruently. It has on many occasions proven convenient to obtain the first weld or adhesive bond area and the second weld or adhesive bond area in a simultaneous manufacturing step, for example in a single welding operation.

The bag or plastics bag, in some cases shipping bag, according to the present disclosure, is closable in such a way that water residues, damp coffee ground residues and/or damp coffee grounds cannot escape again via the original bag opening during storage and transportation. Accordingly, the bags, in some cases plastics bags, according to the disclosure are manufactured in one convenient configuration in such a way that water or moisture cannot escape either via the wall materials of front and rear wall or via the side walls, if present, and also not via the join portions or seams of the respectively joined-together wall portions. The exit of moisture or residual water or of damp coffee grounds from the original bag opening may surprisingly be achieved with the bags, in some cases plastics bags, according to the disclosure merely by folding the closing flap with the adhesion area onto the, in some cases slit-shaped, bag opening and then adhesively bonding it. The adhesion area present on the inner side of the closing flap is in this case expediently designed and configured to close the bag opening liquid-tightly when the closing flap is placed flat against the outer side of the bag front wall.

BRIEF DESCRIPTION OF THE SEVERAL VIEWS OF THE DRAWINGS

Further features and advantages of the present disclosure are revealed by the following description, in which exemplary embodiments of the disclosure are explained by way of example on the basis of schematic drawings, without thereby limiting the disclosure. In the figures.

DETAILED DESCRIPTION

Figure 1:
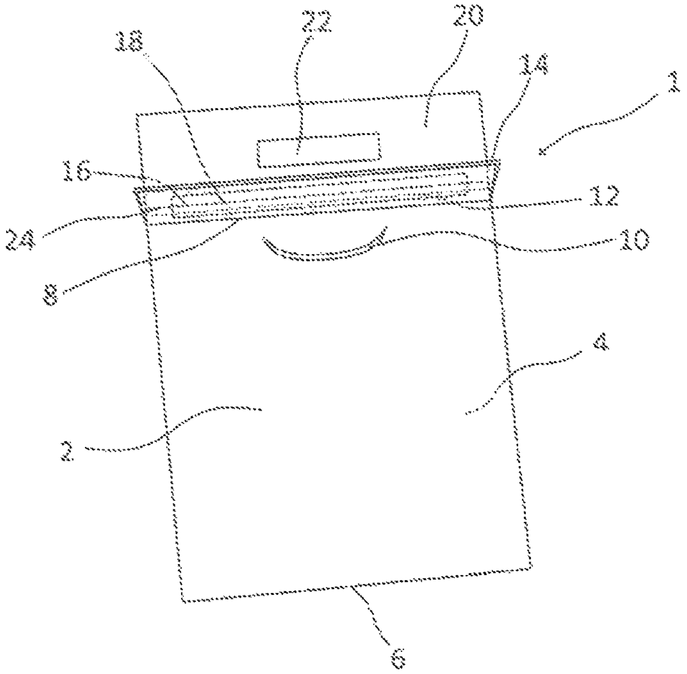
FIG. 1 is a schematic plan view of a first embodiment of a bag according to the present disclosure.

With the bags, in some cases plastics bags, according to the present disclosure, it is possible to collect and transport in a moisture-proof or moisture-tight manner both used coffee capsules which are still full of damp coffee grounds and coffee capsules from which these damp coffee grounds have been removed by simple tipping, for example after tearing open the aluminum foil, such that only damp coffee ground residues remain therein.

The bags, in some cases plastics bags, according to the present disclosure are also distinguished in some cases in that they can easily be made ready for shipping. The materials forming the bags, in some cases plastics bags, according to the disclosure, are conveniently formed from a flexible material and accordingly deformable. For further explanations, it should therefore be assumed that the description relates to an unfilled, undeformed state of the bag, in some cases plastics bag, according to the disclosure, wherein this bag, in some cases shipping bag, is expediently to be considered to be stretched out substantially flat. This is the form in which the bag, in some cases plastics bag, according to the disclosure is also conveniently provided prior to filling with damp waste, in some cases used coffee capsules. The terms "front wall" and "rear wall" have been selected to simplify understanding. It goes without saying that the bag wall which includes the bag opening may in actual service also be configured as a rear wall, wherein the relevant product name and/or logos may then be present on the front wall. It goes without saying that the rear wall may also include such labeling or printing.

In one expedient embodiment, the bag, in some cases plastics bag, according to the present disclosure, is distinguished in that, in some cases when the closing flap is placed flat onto the outer side of the bag front wall, the mutually opposing side edges of the closing flap are placeable against the respectively corresponding side edges of the bag front wall, and in some cases may be brought into a position where they are congruent with the respectively corresponding side edges of the bag front wall. In this way, reliable closure of the bag opening may always be achieved, irrespective of the size and/or shape thereof.

In one embodiment, the bag rear wall of the bag, in some cases plastics bag, according to the present disclosure, may be joined directly to the upper edge portion of the first material strip, in some cases plastics material strip, forming the closing flap, and in some cases may transition in one piece into this upper edge portion. Alternatively, the bag front wall may be joined directly to the upper edge portion of the first material strip, in some cases plastics material strip, forming the closing flap, and in some cases may transition in one piece into this upper edge portion.

The bag front wall is expediently joined via an extension portion, in some cases double-layer extension portion, to the upper edge portion of the first material strip, in some cases plastics material strip, forming the closing flap, and transitions in some cases in one piece into this upper edge portion. In a further embodiment, the bag rear wall of the bag, in some cases plastics bag, according to the present disclosure is highly expediently joined via an extension portion, in some cases double-layer extension portion, to the upper edge portion of the first material strip, in some cases plastics material strip, forming the closing flap, and transitions in some cases in one piece into this upper edge portion.

In highly convenient embodiments, the extension portion has a first portion and a second portion, which are designed and configured to be directly or indirectly placeable against one another by folding over onto themselves, in some cases forming a turnover fold or crease.

The bag rear wall of the bag, in some cases plastics bag, according to the present disclosure, expediently transitions in one piece into the extension portion. Alternatively or in some cases in addition, the extension portion transitions in one piece into the first material strip, in some cases plastics material strip, forming the closing flap.

Alternatively, the bag front wall may also transition in one piece into the extension portion. Alternatively or in some cases in addition, the extension portion may in this case also transition in one piece into the first material strip, in some cases plastics material strip, forming the closing flap.

The bag, in some cases plastics bag, according to the present disclosure, is expediently also distinguished in that the bag rear wall is joined over substantially the entire extent between the mutually opposing side edges to the upper edge portion of the first material strip, in some cases plastics material strip, forming the closing flap, or to the extension portion. Alternatively or in some cases in addition, provision may in this case be made for the upper edge portion of the first material strip, in some cases plastics material strip, forming the closing flap, to be joined over substantially the entire extent between the mutually opposing side edges to the bag rear wall or the extension portion.

In a further embodiment, provision may be made for the bag front wall to be joined over substantially the entire extent between the mutually opposing side edges to the upper edge portion of the first material strip, in some cases plastics material strip, forming the closing flap, or to the extension portion. Alternatively or in some cases in addition, provision may in this case be made for the upper edge portion of the first material strip, in some cases plastics material strip, forming the closing flap, to be joined over substantially the entire extent between the mutually opposing side edges to the bag front wall or the extension portion.

In a highly convenient embodiment, the extension portion of the bag, in some cases plastics bag, according to the present disclosure has, in some cases, a punched handle opening. Highly expediently, in this case the first and second portions of the extension portion in each case have a handle opening or hole. These handle openings or holes are in this case in particular substantially congruent and thus form a uniform handle opening. In a highly suitable embodiment, the congruently positioned holes or handle openings of the first and second portions of the extension portion are joined together, in some cases welded together, in the region of their peripheral edges.

To increase stability and/or carrying and handling comfort, the bags, in some cases plastics bags, according to the present disclosure which are equipped with an extension portion have at least one second material strip, in some cases plastics material strip, which is present at least in places between the first and the second portions of the extension portion, in some cases is joined, for example partially adhesively bonded or welded, to the first and/or second portions of the extension portion.

The second material strip, in some cases plastics material strip, is expediently joined to the second portion of the extension portion. This join may be brought about for example in that the side edges of this material strip are congruent with the side edges of the extension portion and are joined, in some cases welded, together therewith. Alternatively or in addition, the second material strip may have a hole in the region of the handle opening, the peripheral edge of which is joined, in some cases welded, together with the peripheral edges of the holes present in the first and second portions and forming the handle opening. This second material strip may likewise, alternatively or in addition, be fixed in place by the second weld seam. The second material strip expediently extends beyond the second weld seam in the direction of the bag opening, for example over a length in the range from 0.5 to 2 cm. This portion of the second material strip extending beyond the second weld seam does not in this case necessarily have to be joined to the inner side of the extension portion.

The bags, in some cases plastics bags, according to the present disclosure which are highly suitable for solving the problem underlying the disclosure are those in which the bag rear wall is joined, in some cases in one piece, to the extension portion and in which the extension portion transitions, in some cases in one piece, into the first material strip, in some cases plastics material strip, forming the closing flap, and in which moreover the bag front wall extends via an elongation portion to the other side of the first weld or adhesive bond area between the first and second portions of the extension portion, in some cases as far as beyond the handle opening and/or substantially as far as the turnover fold.

The bag front wall, the bag rear wall, and the material strip, in some cases plastics material strip, forming the closing flap or in some cases the bag front wall, the bag rear wall, the extension portion, and the material strip, in some cases plastics material strip, forming the closing flap, are expediently formed substantially in one piece.

In a highly convenient configuration, the bags according to the present disclosure are configured overall substantially in one piece. This may be achieved, for example, in that the film web is folded over in the region of the bottom end, forming a crease. Then the side edges lying against one another of the front and rear wall may be adhesively bonded or welded together.

In a further development of the bag, in some cases plastics bag, according to the present disclosure, at least one third weld or adhesive bond area, in some cases one third weld seam, is present, which joins together the inner sides of the bag front wall and the bag rear wall, in some cases liquid-tightly, and which extends from the first weld or adhesive bond area to the closed lower bag end, forming bag compartments, wherein the bag compartments, in some cases all the bag compartments, have the at least one bag opening. By subdividing the bag, in some cases plastics bag, according to the disclosure into a plurality of separate bag compartments, which are each in themselves in some cases liquid-tight, the damp waste intended for recycling may be separated at an early point, for example into its segregated constituents. For instance, a plastics body may be transferred into a first bag compartment via the bag opening present in that bag compartment, while the aluminum closing foil separated from this plastics body may be introduced into a second bag compartment, which is likewise provided with a bag opening. The individual bag compartments may be made distinguishable by suitable printing or coloring.

The bag opening of the bags, in some cases plastics bags, according to the present disclosure is present in some cases in the form of an opening slit with a first and an opposing second end, or may alternatively also take the form of a cross-shaped slit. Preferably, the opening slit has a greater extent than the distance along the rectilinear join between the first and second ends of the opening slit, wherein this rectilinear join between the first and second ends of the opening slit is a closer distance from the first and/or second weld or adhesive bond area than the opening slit. Such opening slits may in some cases take the form of an oval or kidney-shaped punched portion (or “C handle”).

Alternatively, the opening slit may also be of rectilinear configuration, for example parallel to the first and/or second weld or adhesive bond area or also at an angle thereto. Furthermore, the opening slit may be formed by two sides of a triangle, or also by three contiguous sides of a rectangle, square, or trapezium.

The bag opening may also assume other shapes and, for example, take the form of a strip, in some cases with a substantially rectangular base area. The bag opening may also assume an oval or circular form.

Furthermore, in a further very convenient embodiment provision is made for the adhesion area, in some cases the adhesive strip, to extend substantially parallel to the upper edge of the front wall and/or the rear wall of the bag and/or substantially parallel to the first weld or adhesive bond area, in some cases to the first weld or adhesive bond area. With the above-described arrangement of the adhesive means or adhesive strips, very efficient and reliable manufacture of the bags according to the present disclosure is generally achieved.

In a further alternative configuration, provision may be made, with a bag according to the present disclosure, for the adhesion area to end at a distance of expediently at most 20 mm, and highly expediently at most 10 mm, from the one side edge and/or at a distance of expediently at most 20 mm, and highly expediently at most 10 mm, from the opposing side edge of the closing flap. In this way too, liquid-tight bags are obtained which can be used for dry transportation of damp waste, in some cases used coffee capsules. Provision may further be made for the adhesion area to extend in some cases continuously from the one side edge as far as the opposing side edge of the closing flap.

The adhesion area, in some cases the adhesive strip, comprises or constitutes in one very feasible configuration double-sided adhesive means, in some cases double-sided adhesive strips. It may in this case also be provided that at least one, expediently each, of the adhesive means, in some cases adhesive strips, comprises at least one detachable protective film, wherein the protective film in some cases prevents joining of the front wall to the rear wall. The above-described measures result in particularly moisture-tight bags according to the present disclosure, which are very safely suitable for dry transportation of the damp waste, in some cases used coffee capsules, collected with the bags according to the present disclosure.

The bags according to the present disclosure also include bags which have first and/or second side wall elements between the mutually opposing side edges of the front and rear walls. The side wall elements may in this case also constitute or contain side folds, which extend in some cases from the bottom end of the front and rear walls.

The bag front wall and the bag rear wall and optionally the side walls of the bag and/or the plastics material strip forming the closing flap and/or the extension portion comprise or are preferably substantially made of polyolefins, in some cases polyethylene, and/or polyesters. The bag front wall, the bag rear wall, the plastics material strip forming the closing flap and the extension portion, as well as optionally the side walls, are preferably substantially made from polyolefins, in some cases polyethylene, and/or polyesters or comprise these. Alternatively, the bags according to the present disclosure may also be made from a paper material, in some cases a paper material that in some cases is laminated with at least one plastics film or hydrophobized on one or both sides.

In this case in particular, those embodiments are highly advantageous in which the front wall has a first outer layer substantially consisting of or comprising at least one polymer material, in some cases polyethylene, and an opposing first inner layer substantially consisting of or comprising at least one polymer material, in some cases polyethylene, and in which the rear wall has a second outer layer substantially consisting of or comprising at least one polymer material, in some cases polyethylene, and an opposing second inner layer substantially consisting of or comprising at least one polymer material, in some cases polyethylene. In an expedient configuration, numerous first cavities are present between the first outer layer and the first inner layer which are delimited from one another by first walls, preferably substantially consisting of or comprising at least one polymer material, in some cases polyethylene, and numerous second cavities are present between the second outer layer and the second inner layer which are delimited from one another by second walls, preferably substantially consisting of or comprising at least one polymer material, in some cases polyethylene. In this case, in a highly convenient embodiment, the first cavities in each case have parallel to the first outer layer and the second cavities in each case have parallel to the second outer layer at least one cross-section in which the walls of the cavities in each case describe an oval, in some cases are circular.

The above-described embodiment of a bag according to the present disclosure is also distinguished by an advantageous further development in that the cavities have a central longitudinal extent and, in some cases orthogonal thereto, a central transverse extent, wherein the central longitudinal extent is greater than the central transverse extent and wherein the central longitudinal extent amounts to at most five times the central transverse extent. In this case, the central longitudinal extent is conveniently in the range from 0.01 mm to 50 mm, expediently in the range from 0.1 to 25 mm, and highly expediently from 3 to 15 mm. Alternatively or expediently in addition, the central transverse extent is conveniently in the range from 0.005 mm to 30 mm, expediently in the range from 0.5 to 10 mm, and highly expediently from 1 to 5 mm.

In one alternative configuration of an advantageous multilayer bag according to the present disclosure, provision is made for the front wall and/or the rear wall to have at least three layers, wherein the at least three-layer front wall and/or the at least three-layer rear wall comprise(s) a first layer (inner layer), at least one second layer (interlayer), and a third layer (outer layer), wherein, in relation to the second layer, the first layer faces the interior of the bag and/or forms the inner side, wherein the at least one second layer is arranged between the first and third layers and comprises a plastics film, in some cases polyolefin film, or consists thereof. In relation to the second layer, the third layer faces the outer side of the bag and/or forms the outer side, wherein the at least one second layer has a plurality of gathered or folded strip-shaped elongate regions, in some cases strips, extending at a distance from one another, and wherein the at least one second layer is joined to the first and/or third layer by means of weld and/or adhesive bond seams, which extend transversely of, in some cases substantially orthogonal to, the gathered or folded strip-shaped elongate regions.

For the above-described embodiment of a bag according to the present disclosure, provision is expediently made for the first layer (inner layer) of the front and/or rear wall, in some cases the first and second layers of the front and/or rear wall, in each case to comprise at least one plastics film, in some cases polyolefin film, or consist thereof, and/or for the third layer (outer layer) of the front and/or rear wall to comprise at least one plastics film, in some cases polyolefin film, or consist thereof.

In the above-described embodiment, those bags according to the present disclosure are highly suitable in which the front wall and the rear wall are at least three-layered and in each case comprise the first, second, and third layers, wherein in some cases the first and second layers and optionally also the third layer of the front or rear wall in each case comprise at least one plastics film, in some cases polyethylene film, or consist thereof.

In this case, provision may alternatively or in some cases also additionally be made for the gathered strip-shaped elongate regions to constitute cross-sectionally, in some cases substantially channel-like, protrusions, comprising openings and depressions, from areas of the second layer or for the folded strip-shaped elongate regions to constitute cross-sectionally substantially Z-shaped folds of areas of the second layer. In a highly suitable further development of this embodiment, provision is made for the depressions of the protrusions of the gathered, strip-shaped, elongate regions to face the first layer and for the opening of the gathered, strip-shaped, elongate regions to face the third layer.

In principle, the bags according to the present disclosure may be configured in many different ways, always in order to solve the problem underlying the disclosure. For example, those bags are also highly suitable in which the crosswise extent of the rear wall and of the front wall, measured from the one side edge to the opposing side edge of the bag, is smaller than the lengthwise extent of the front wall or of the rear wall, measured from the bottom end to the opening end. Alternatively, provision may be made for the crosswise extent of the rear wall and of the front wall, measured from the one side edge to the opposing side edge of the bag, to be greater than the lengthwise extent of the front wall or of the rear wall, measured from the bottom end to the opening end.

Furthermore, those bags according to the present disclosure may also be used in which the lengthwise extent of the rear wall, measured from the bottom end to the opening end, is greater than the lengthwise extent of the front wall, measured from the bottom end to the opening end.

To arrive at bags according to the present disclosure with a larger conveying volume, it is possible, as an alternative or in addition to the provision of side walls or side folds, to arrange a bottom fold between the bottom edges of front and rear wall.

A particularly high level of moisture-proofness and/or transport safety may also be obtained in that the bag front wall and/or the bag rear wall and optionally the side walls and/or the material strip, in some cases material strip, in some cases plastics material strip, forming the closing flap, and/or the extension portion, expediently the bag front and bag rear walls, are of multilayer construction, in some cases have two or three layers, for example take the form of a double-layer or multilayer bubble wrap.

The bags, in some cases plastics bags, according to the present disclosure, conveniently constitute in some cases a liquid-tight collection and expediently also shipping bag for, in some cases damp, waste, in some cases packaged waste. The damp packaged waste is in this case expediently used coffee capsules, and in some cases used aluminum coffee capsules. Underlying the present disclosure is the surprising recognition that it is relatively feasible to obtain bags, expediently plastics bags, which are suitable for use as collection and/or shipping bags, which can be simply and reliably liquid-tightly closed in such a way that they can be used for the collection or transportation of damp waste, in some cases used coffee capsules, and highly expediently used aluminum coffee capsules. It has moreover surprisingly been shown that using the bags, in some cases shipping bags, according to the disclosure results in very efficient metal recycling. In one possible embodiment, provision is made for the quantity of bag material to be negligible relative to the quantity of recyclable metal, such that it does not disturb the melting process and does not have to be previously separated. In this case, the bags may consequently be supplied to the metal melting process together with the used aluminum coffee capsules contained therein.

In one very convenient configuration, the bags according to the present disclosure already have on the front and/or rear all necessary address data and other information for shipping and are optionally also franked with a sufficient amount, so that they can be transported to a collection point after mailing by the user. It is alternatively possible to collect the shipping bags according to the disclosure, filled with used coffee capsules and sealed, in decentralized manner, for example at drugstores, supermarkets or pharmacies and thence send them for recycling. That is, in a convenient configuration the shipping bag according to the disclosure is pre-labeled in such a way that return by the final consumer can no longer go wrong.

The present disclosure further describes a method for collecting, in some cases damp, waste, in some cases general cargo waste, comprising the steps of:

a) providing a bag, in some cases plastics bag, according to the present disclosure;
b) filling the bag, in some cases plastics bag, with, in some cases damp, waste, in some cases used aluminum coffee capsules, via the bag opening;
c) folding down the first material strip, in some cases plastics material strip, forming the closing flap, onto the outer side of the bag front wall; and
d) adhesively bonding the first material strip, in some cases plastics material strip, forming the closing flap, by means of the adhesion area, in some cases adhesive strip, to the outer side of the bag front wall, achieving in some cases liquid-tight closure of the bag opening.

In this case, provision is conveniently made for the closing flap to be foldable down onto the front wall, whereby the adhesion area closes the at least one bag opening. For many applications, it has proven advantageous for the adhesion area to end at a distance of expediently at most 20 mm, and highly expediently at most 10 mm, from the one side edge and/or end at a distance of expediently at most 20 mm, and highly expediently at most 10 mm, from the opposing side edge of the rear wall. In this way, protective films or protective strips may be attached to the adhesion area which extend laterally beyond this adhesion area and are thus not joined thereto, but which do not project beyond the side edge(s) and, for example, terminate flush with these side edges. In this way, the protective film or the protective strip may be easily gripped and pulled off the adhesion area.

With the method according to the present disclosure, very reliable full closure of the bag according to the disclosure may be ensured.

With the method according to the present disclosure, the bags according to the disclosure are expediently filled with used coffee capsules, in some cases used aluminum coffee capsules.

In a further development of the method according to the present disclosure, the latter likewise comprises shipping of the bags, in some cases plastics bags, closed according to step d), to a collection point.

Moreover, the problem underlying the present disclosure is solved by a method for recycling used coffee capsules, comprising:

i) collecting a plurality of bags filled with used aluminum coffee capsules, in some cases by the above-described method according to the disclosure for filling bags or plastics bags, in some cases shipping bags, according to the disclosure;
ii) subjecting the plurality of collected bags, in some cases plastics bags, containing used aluminum coffee capsules to a melting process;
iii) isolating the molten aluminum; and
iv) allowing the isolated molten aluminum to solidify.

In this case, in a convenient configuration, the used aluminum coffee capsules are subjected to the melting process together with the bags.

Finally, the present disclosure relates to use of the bags according to the disclosure for the collection of, in some cases damp, waste, in some cases used aluminum coffee capsules. It also relates to use of the bags, in some cases plastics bags, according to the disclosure, for the shipping of, in some cases damp, waste, in some cases used aluminum coffee capsules, to a collection point for this waste.

Turning to the drawings, FIG. 1 shows a bag (1) according to the present disclosure with closed lower bag end (6) and an opposing closed upper bag portion (8). The bag (1), expediently a plastics bag, comprises a bag front wall (2) with an inner side and an outer side as well as a bottom edge and mutually opposing side edges, and a bag rear wall (4) with an inner side and an outer side as well as a bottom edge and mutually opposing side edges. In the embodiment shown, the bag front wall (2) and bag rear wall (4) are joined directly together in the region of their side edges and bottom edges. The lower bag end (6), when used as stated, is here closed in the region of the bottom edges of the bag front wall (2) and the bag rear wall (4) and forms a bag bottom.

The bag opening (10) is present in the bag front wall at a closer distance from the closed upper bag portion (8) than from the lower bag end (6). The bag opening (10) extends in the direction from the one side edge to the opposing side edge, and is present in the form of an oval or kidney-shaped punched portion (or "C handle"). The closed upper bag portion (8) is formed, in the bag (1) shown, by a first weld seam (12) joining the inner sides of the bag front wall (2) and the bag rear wall (4) and extending from the one side edge as far as the opposing side edge.

The bag (1) according to the disclosure further comprises a first material strip, in some cases plastics material strip, forming a closing flap (14), with an inner side and an outer side and with an upper edge portion (15), a lower edge portion (17), and mutually opposing side edges. A strip-shaped adhesion area (18) in the form of an adhesive strip is present on the inner side of the closing flap (14). This adhesion area (18) is designed and configured to cover the bag opening when the closing flap (14) is placed flat onto the outer side of the bag front wall (2). In this case, the at least one adhesion area (18) and the lower edge portion (17) of the closing flap (14) extend to the other side of the bag opening (10) in relation to the first weld seam (12). The adhesion area (18) is provided with a removable protective film (24). Furthermore, the closing flap (14) is joined along the upper edge portion (15) in the region of the upper bag portion (8) above the bag opening (10) to the outer side of the bag front wall (2) along a second weld seam (16). In the embodiment illustrated, the first and second weld seams are positioned mutually congruently and have been manufactured in a single operation. The bag according to FIG. 1 additionally has an extension portion (20) with a handle opening (22).

Figure 2:
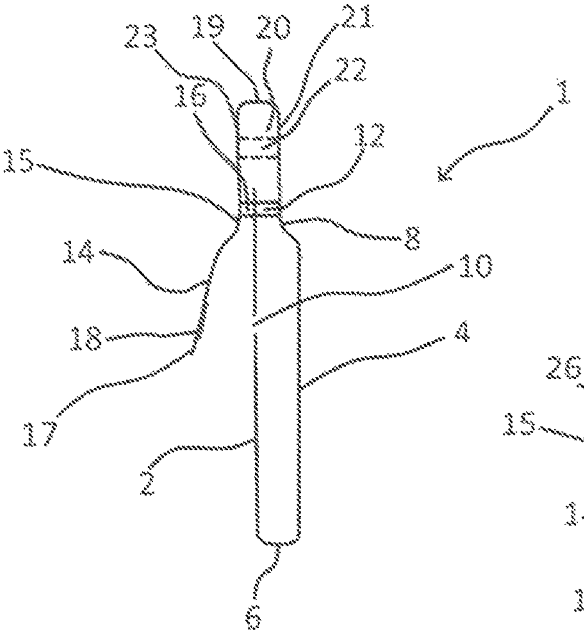
FIG. 2 is a schematic cross-sectional view of the bag according to FIG. 1.

FIG. 2 shows a schematic cross-sectional view of the bag according to FIG. 1. The first and second weld seams (12, 16) are congruent. The front wall (2) has the bag opening (10) in the form of a slit. In the embodiment illustrated, at the first weld seam (12) the rear wall (4) transitions in one piece into the extension portion (20). This extension portion (20) has a first portion (21), which adjoins the first weld seam (12), and a second portion (23), which leads into the second weld seam (16). The first and second portions of the extension portion (20) transition in one piece into one another at the turnover fold or turnover portion (19), their inner sides being placeable one against the other. The, in some cases punched, handle opening (22) is congruent in both the first and second portions (21, 23) of the extension portion (20). In one expedient configuration, the peripheral edges of the holes present in the first and second portions (21, 23) and forming the handle opening (22) are joined, in some cases welded, together, in some cases throughout. In the embodiment illustrated, the closing flap (14), on the inner side of which the adhesion area (18) is present, is attached in one piece to the second portion (23) of the extension portion (20 via the upper edge portion (15). By folding the closing flap (14) onto the outer side of the front wall (2), the adhesion area (18) comes to lie over the bag opening (10) and closes it in liquid-tight manner.

Figure 3:
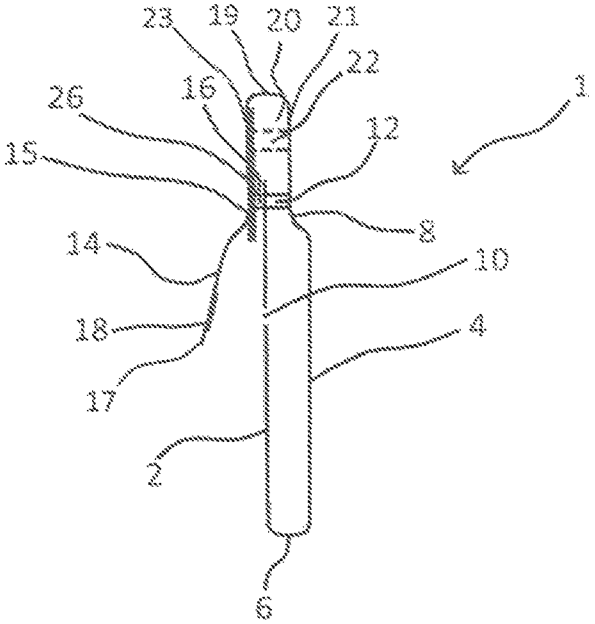
FIG. 3 is a schematic cross-sectional view of a second embodiment of a bag according to the present disclosure.

The embodiment of a bag (1) according to the present disclosure shown in schematic cross-sectional view in FIG. 3 differs from the bag according to FIGS. 1 and 2 in that it is additionally provided with a second material strip (26), in some cases plastics material strip, which is present between the first and second portions (21, 23) of the extension portion (20) and which is joined in the embodiment illustrated to the second portion (23) of the extension portion (20). This join may be brought about, for example, in that the side edges of this material strip are congruent with the side edges of the extension portion (20) and are joined, in some cases welded, together therewith. Alternatively or in addition, the second material strip (26) may have a hole in the region of the handle opening (22), the peripheral edge of which is joined, in some cases welded, together with the peripheral edges of the holes present in the first and second portions (21, 23) and forming the handle opening (22). This second material strip (26) is likewise fixed in place by the second weld seam (16).

In the embodiment illustrated, the second material strip (26) expediently extends beyond the second weld seam (16) in the direction of the bag opening (10), for example over a length in the range from 0.5 to 2 cm. This portion of the second material strip (26) extending beyond the second weld seam (16) does not in this case necessarily have to be joined to the inner side of the extension portion (14).

Figure 4:
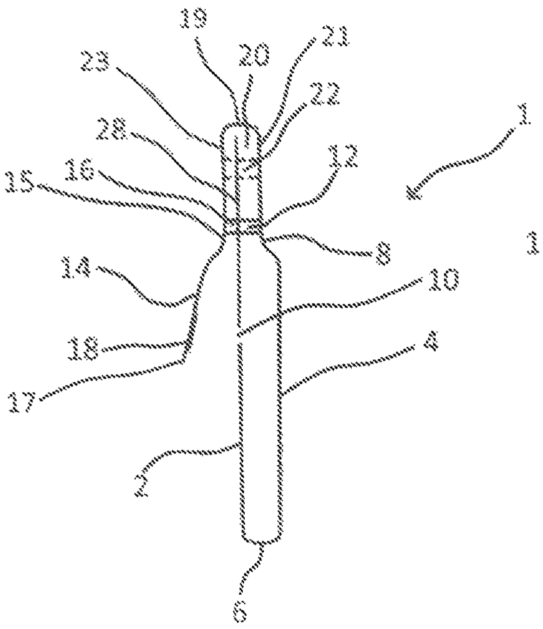
FIG. 4 is a schematic cross-sectional view of a third embodiment of a bag according to the present disclosure.

A further embodiment of a bag according to the present disclosure shown in schematic cross-sectional view in FIG. 4 differs from the embodiment according to FIGS. 1 and 2 in that the bag front wall (2) extends via an elongation portion (28) the other side of the first weld seam (12) between the first and second portions (21, 23) of the extension portion (20) to beyond the handle opening and substantially as far as the turnover fold or turnover portion (19) and does not end substantially directly after the first weld seam (12). In the embodiment illustrated, the elongation portion (28) likewise has a hole in the region of the handle opening (22), the peripheral edge of which is joined, in some cases welded (not shown), together with the peripheral edges of the holes present in the first and second portions (21, 23) and forming the handle opening (22). This provides additional fixing. Like the second material strip in the embodiment according to FIG. 3, the elongation portion (28) of the front wall (2) also contributes to improved handling and a more upmarket look for the bag according to the disclosure.

Figure 5:
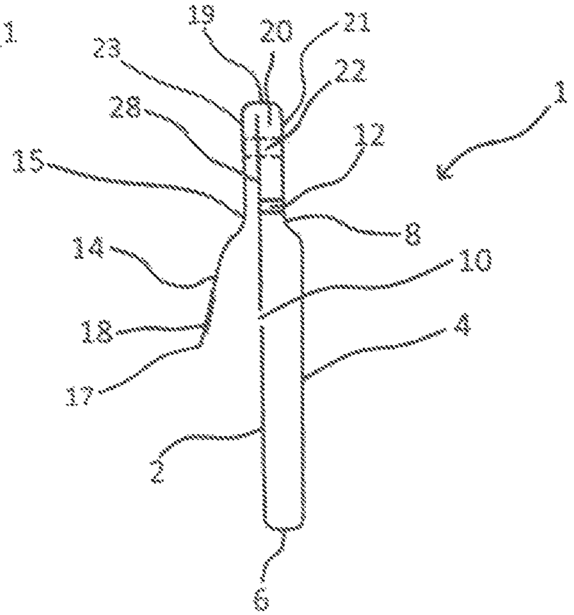
FIG. 5 is a schematic cross-sectional view of a fourth embodiment of a bag according to the present disclosure.

The embodiment according to FIG. 5 differs from the bag according to FIG. 4 in that the bag (1) does without the second weld seam. In this case, the second portion of the extension portion (20) may likewise have a hole in the region of the handle opening (22). In one configuration, the border thereof may be joined, for example welded, to the borders of the substantially congruent holes in the front wall (2) and in the second portion (23) of the extension portion (20).

Figure 6:
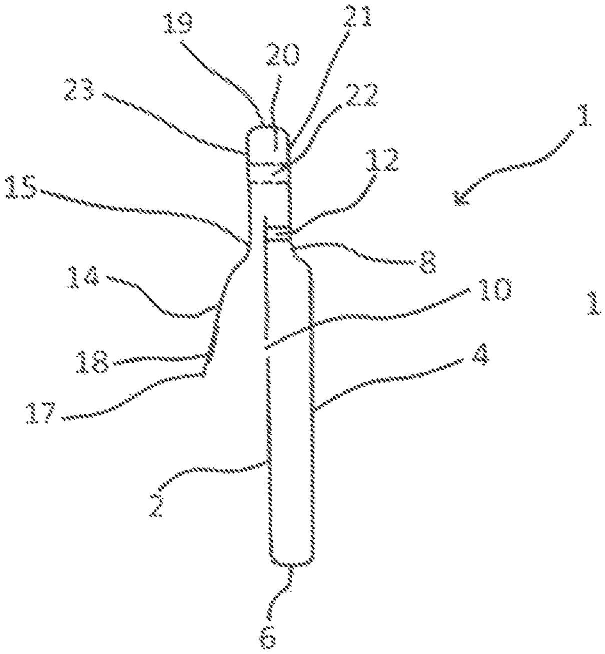
FIG. 6 is a schematic cross-sectional view of a fifth embodiment of a bag according to the present disclosure.

The embodiment according to FIG. 6 differs from the bag according to FIGS. 1 and 2 in that the bag (1) does without the second weld seam.

Figure 7:
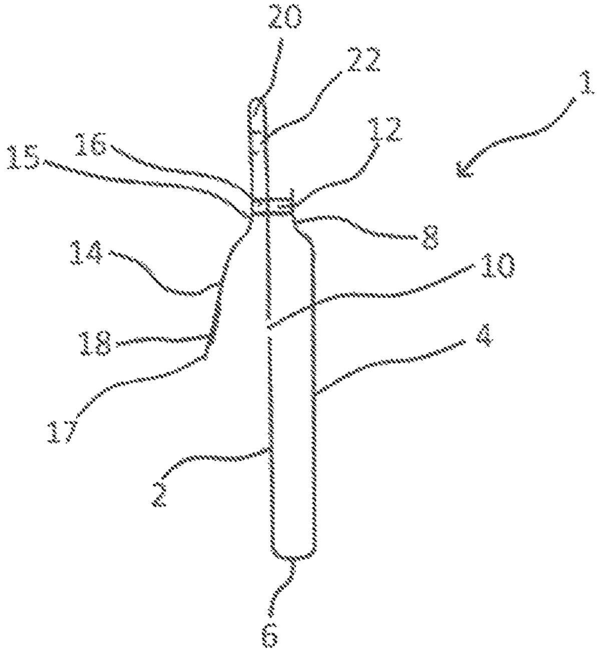
FIG. 7 is a schematic cross-sectional view of a sixth embodiment of a bag according to the present disclosure.

The embodiment according to FIG. 7 of a bag (1) according to the present disclosure differs from the embodiment according to FIGS. 1 and 2 in that the extension portion (20) is formed, as it were, by the elongation portion (28) of the front wall (2) and the second portion (23) of the extension portion (20). Accordingly, no first portion of the extension portion is attached to the rear wall (4) following the first weld seam (12). The handle opening (22) is formed by substantially congruent holes in the elongation portion (28) and the second portion (23) of the extension portion (20). The bag front wall (2) and the second portion of the extension portion (20) are fixed in place by the second weld seam (16). In the embodiment illustrated, the closing flap (14) is attached in one piece at the upper edge portion (15) to the second portion (23) of the extension portion (20).

Figure 8:
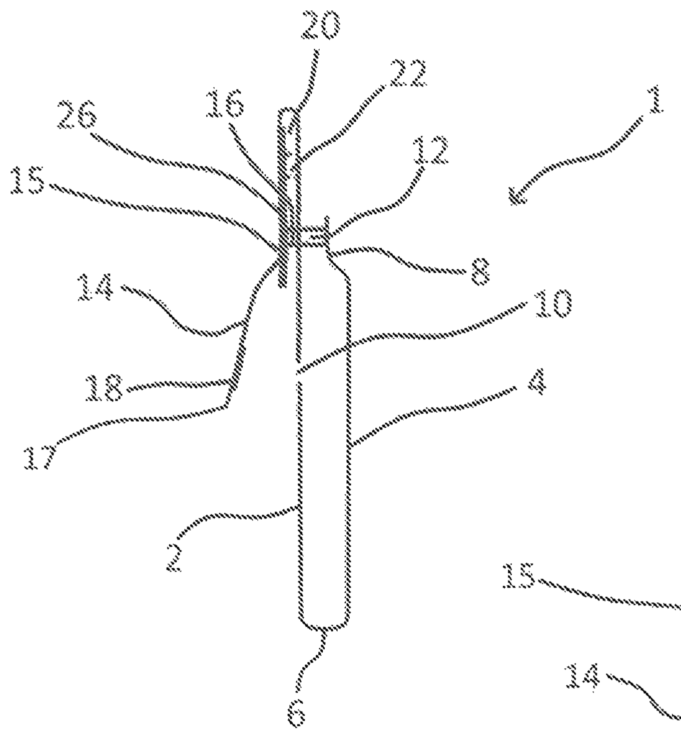
FIG. 8 is a schematic cross-sectional view of a seventh embodiment of a bag according to the present disclosure.

The embodiment according to FIG. 8 of the bag (1) according to the present disclosure differs from the embodiment according to FIG. 7 in that the latter, as described above for the embodiment according to FIG. 3, is additionally provided with a second material strip (26), in some cases plastics material strip. In the embodiment illustrated, this second material strip (26) is present between the elongation portion (28) and the second portion (23) of the extension portion (20). Fixing of this second material strip (26) may here be undertaken in the same way as described above for the embodiment according to FIG. 3.

Figure 9:
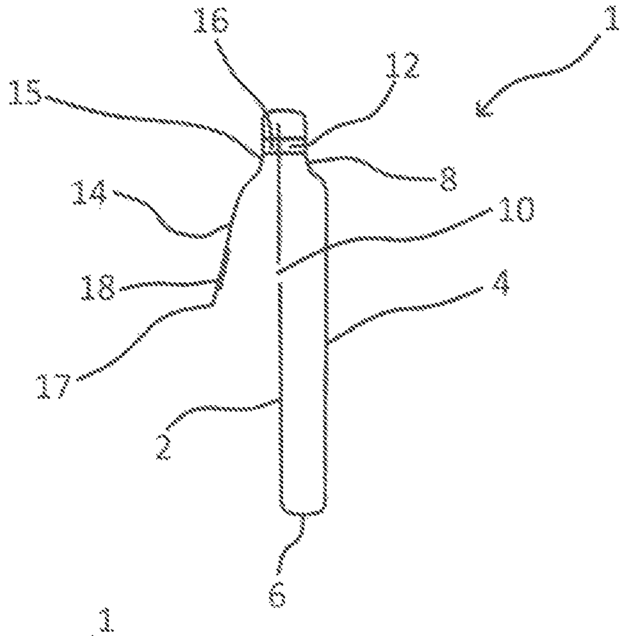
FIG. 9 is a schematic cross-sectional view of an eighth embodiment of a bag according to the present disclosure.

The embodiment according to FIG. 9 of a bag (1) according to the present disclosure differs from the embodiment according to FIGS. 1 and 2 in that it does without the extension portion (20) and thus also without the handle opening (22). Instead, the rear wall (4) here transitions after the first weld seam (12), via a short connecting portion covering the first and second weld seams (12, 16), substantially directly at the second weld seam (16) into the upper edge portion (15) of the closing flap (14).

Figure 10:
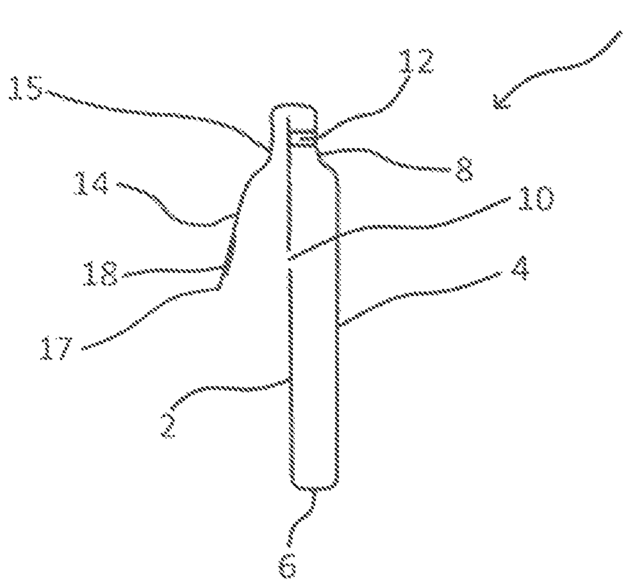
FIG. 10 is a schematic cross-sectional view of a ninth embodiment of a bag according to the present disclosure.

The embodiment according to FIG. 10 of a bag (1) according to the present disclosure differs from the embodiment according to FIG. 9 in that it does without the second weld seam (16).

Figure 11:
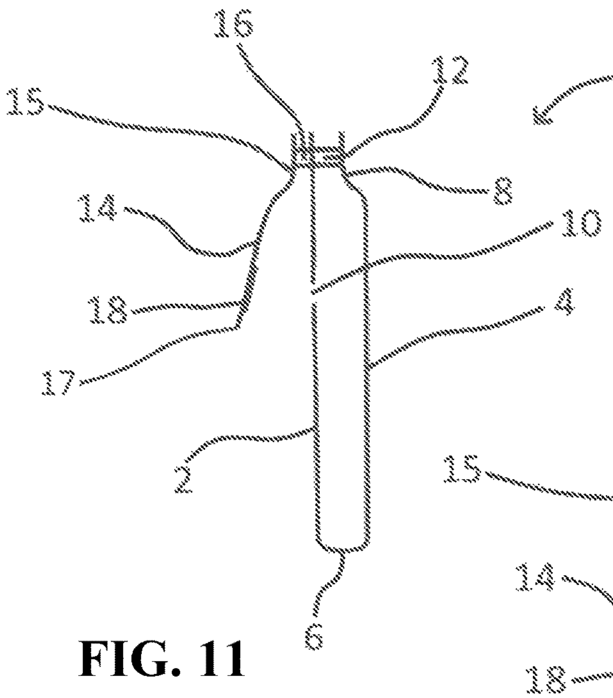
FIG. 11 is a schematic cross-sectional view of a tenth embodiment of a bag according to the present disclosure.

The embodiment according to FIG. 11 of a bag (1) according to the present disclosure differs from the embodiment according to FIG. 9 in that it does without the short connecting portion.

Figure 16:
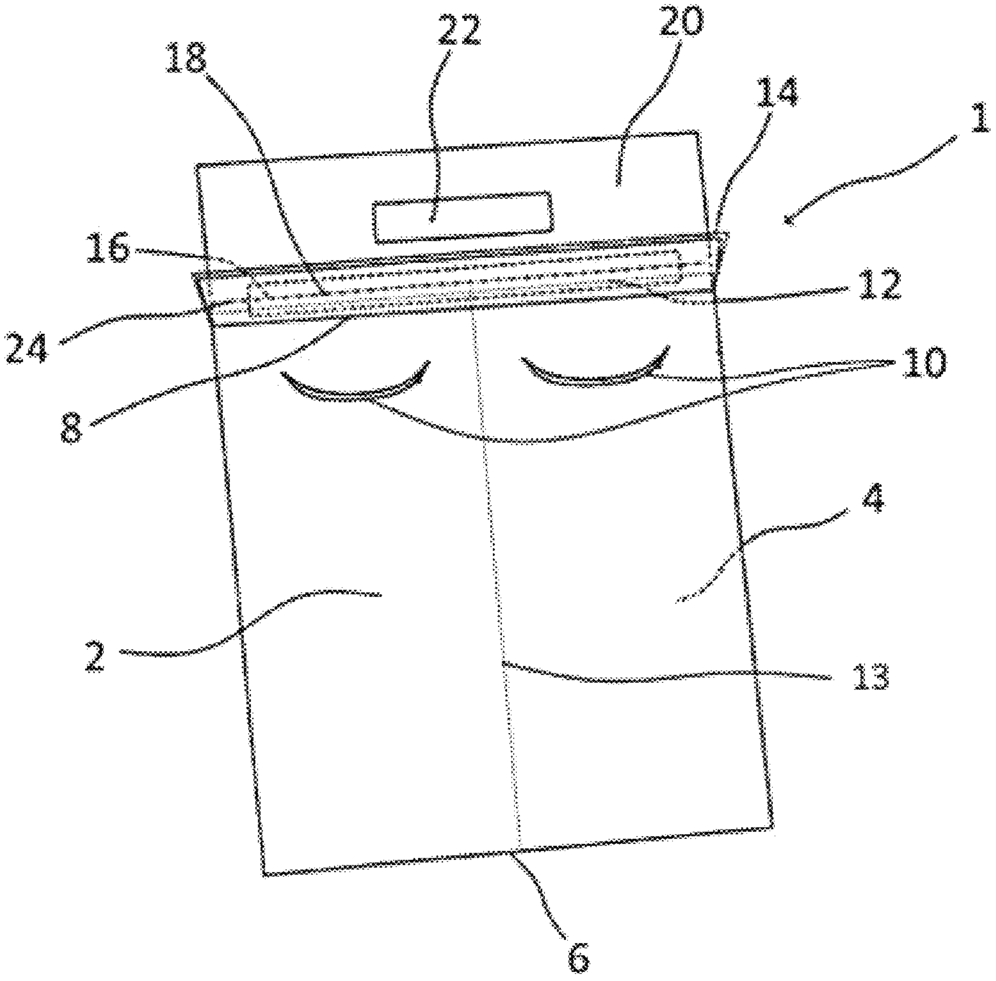
FIG. 16 is a schematic plan view of a fifteenth embodiment of a bag according to the present disclosure.

The embodiment according to FIG. 16 of a bag (1) according to the present disclosure differs from the embodiment according to FIG. 1 in that it includes at least one third weld or adhesive bond area (13), in some cases a third weld seam, which joins together the inner sides of the bag front wall (2) and the bag rear wall (4), in some cases liquid-tightly, and which extends from the first weld or adhesive bond area (12) to the closed lower bag end (6), forming bag compartments. The bag compartments have the at least one bag opening (10). Subdividing the bag (1) into a plurality of separate bag compartments enables damp waste inserted therein to be separated at an early point into segregated constituents.

Figure 12:
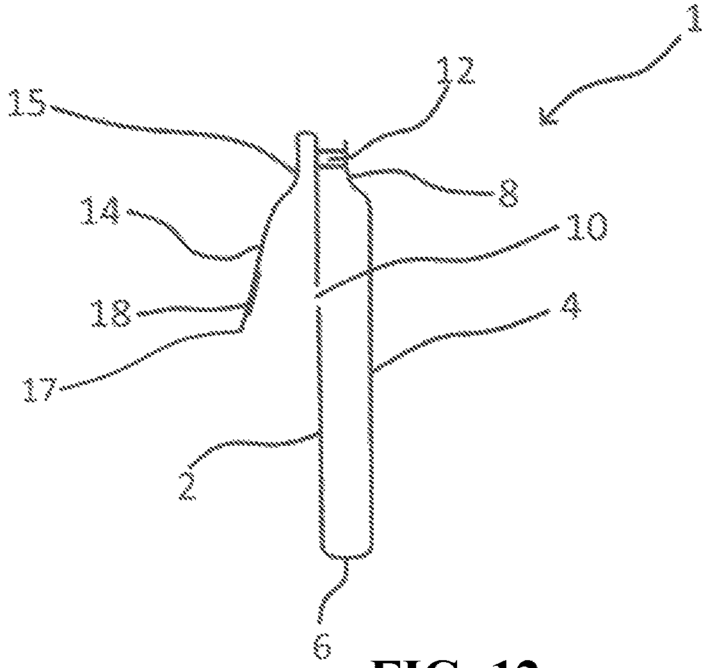
FIG. 12 is a schematic cross-sectional view of an eleventh embodiment of a bag according to the present disclosure.

The embodiment according to FIG. 12 of a bag (1) according to the present disclosure differs from the embodiment according to FIG. 7 in that it does without the extension portion (20) and without the second weld seam (16).

Figure 13:
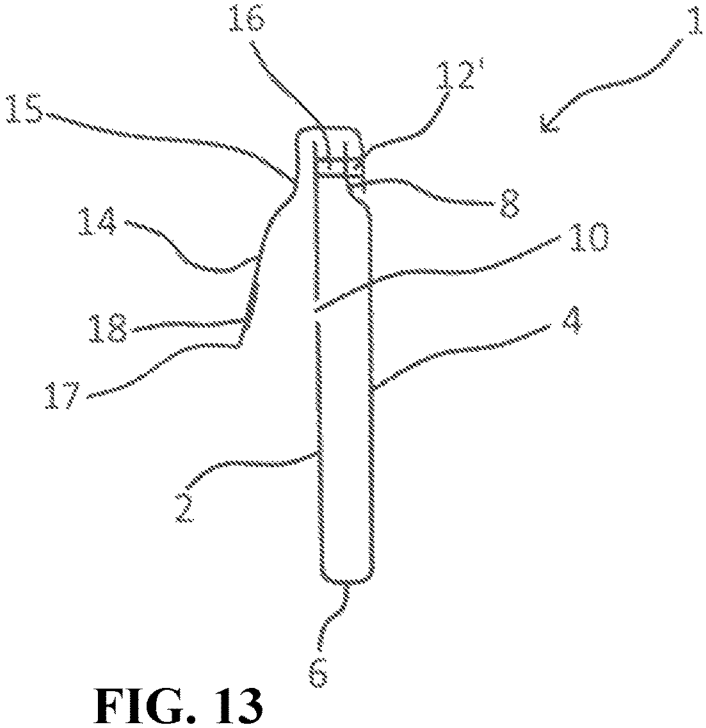
FIG. 13 is a schematic cross-sectional view of a twelfth embodiment of a bag according to the present disclosure.

The embodiment according to FIG. 13 of a bag (1) according to the present disclosure differs from the embodiment according to FIG. 11 in that the closing flap (14) is not fastened to the outer side of the front wall (2) via a weld or adhesive bond seam but rather to the outer side of the rear wall (4). In this way, the closing flap simultaneously forms a transition portion, which conceals the weld or adhesive bond seam (12) in the case of closure of the bag opening (10) with the adhesion area (18).

Figure 14:
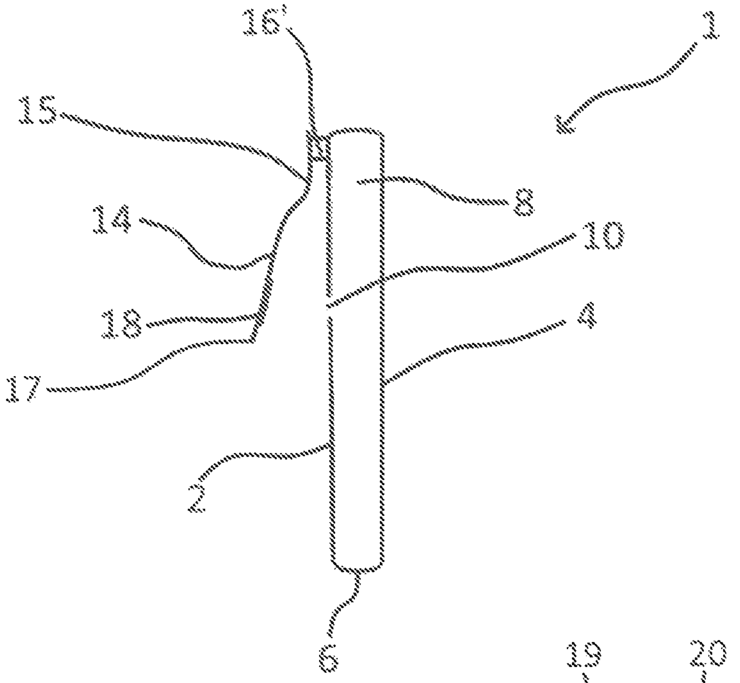
FIG. 14 is a schematic cross-sectional view of a thirteenth embodiment of a bag according to the present disclosure.

The embodiment according to FIG. 14 of a bag (1) according to the present disclosure differs from the embodiment according to FIG. 5 in that the front wall (2) or the elongation portion (28) of the front wall (2) transitions directly into the first portion (21) of the extension portion (20) in the region of the turnover fold or turnover portion (19) and in that in the bag formed thereby there is no handle opening (22) and also no first weld or adhesive bond seam (12). Instead, the closing flap (14), as in FIG. 11, is fastened on the outer side of the front wall (2) by means of a weld or adhesive bond joint (16'), such that when the closing flap is folded down onto the front wall (2) the adhesion area (18) comes to lie over the bag opening (10). The bag according to FIG. 14 enables manufacture on the basis of tubular film. This ensures very efficient mechanical manufacture.

Figure 15:
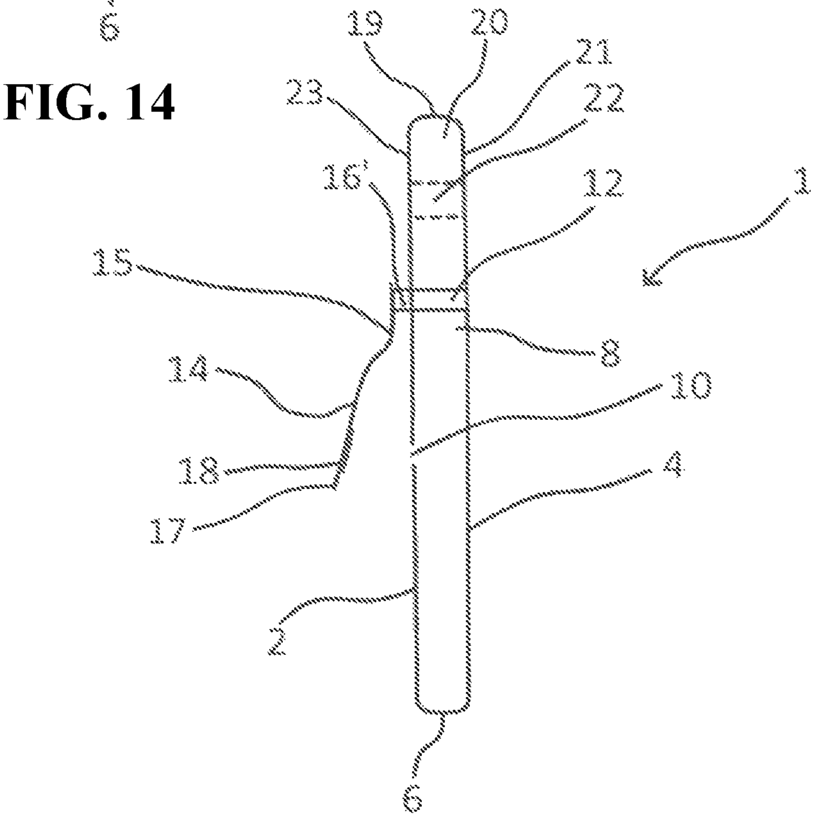
FIG. 15 is a schematic cross-sectional view of a fourteenth embodiment of a bag according to the present disclosure.

The embodiment according to FIG. 15 of a bag (1) according to the present disclosure differs from the embodiment according to FIG. 14 both in that it is equipped with a first weld or adhesive bond seam (12), which expediently lies at roughly the same height as the second weld or adhesive bond seam (16'), and in that an extension portion (20) adjoins the first weld or adhesive bond seam (12) with a first portion (21), which extends the bag rear wall, and a second portion (23), which transitions into the bag front wall (2) at the first weld or adhesive bond seam (12). As illustrated, in this extension portion (20) a handle opening (10) may be present. The bag according to FIG. 15 also enables manufacture on the basis of a tubular film.

The features disclosed in the above description, in the claims, and in the drawings may be of significance for implementation of the disclosure in its various embodiments, either individually or in any desired combination.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bag for the collection of waste, comprising:

a bag front wall with an inner side and an outer side as well as a bottom edge and mutually opposing side edges;

a bag rear wall with an inner side and an outer side as well as a bottom edge and mutually opposing side edges, wherein the bag front wall and the bag rear wall are joined together in a region of their side edges and bottom edges, at least in sections, directly or via side walls and/or side folds and/or a bottom fold;

a lower bag end, closed when used, in the region of the bottom edges of the bag front wall and the bag rear wall, comprising:

a bag bottom, and a closed upper bag portion opposite the bag bottom, wherein at a closer distance from the closed upper bag portion than from the lower bag end, at least one bag opening is present in one portion of the bag front wall, and wherein the closed upper bag portion is formed by:

a first weld or adhesive bond area which joins the bag front wall and the bag rear wall, and which extends respectively from the one side edge as far as the opposing side edge; and further comprising a first material strip forming a closing flap, with an inner side and an outer side and with an upper edge portion, a lower edge portion and mutually opposing side edges, wherein the closing flap has an adhesion area on the inner side, wherein the at least one adhesion area is designed and configured, when the closing flap is placed flat onto the outer side of the bag front wall, to cover the at least one bag opening, wherein at the same time the at least one adhesion area and/or the lower edge portion of the closing flap extend(s) to the other side of the bag opening in relation to the first weld or adhesive bond area, wherein the adhesion area present on the inner side of the closing flap is designed and configured to close the bag opening liquid-tightly on flat placing of the closing flap against the outer side of the bag front wall, wherein the closing flap is joined along the upper edge portion in a region of the upper bag portion above the bag opening to the bag front wall along a second weld or adhesive bond area, wherein the bag rear wall is joined directly to the upper edge portion of the first material strip forming the closing flap, and transitions in one piece into this upper edge portion, wherein the first weld or adhesive bond area and the second weld or adhesive bond area extend substantially congruently, and wherein the second weld or adhesive bond area extends from the one side edge as far as the opposing side edge of the closing flap.

2. The bag according to claim 1, wherein when the closing flap is placed flat onto the outer side of the bag front wall, the mutually opposing side edges of the closing flap are placeable against the respectively corresponding side edges of the bag front wall.

3. The bag according to claim 1, wherein:

the bag rear wall is joined via a double-layer extension portion to the upper edge portion of the first material strip forming the closing flap, and transitions in one piece into the upper edge portion, or the bag front wall is joined directly or via an extension portion to the upper edge portion of the first material strip forming the closing flap, and transitions in one piece into this upper edge portion;

and wherein:

the extension portion has a first portion and a second portion that are designed and configured to be directly or indirectly placeable against one another by folding over onto themselves, forming a turnover fold or crease.

4. The bag according to claim 1, wherein:

the bag rear wall is joined via an extension portion to the upper edge portion of the first material strip forming the closing flap, and transitions in one piece into the upper edge portion; and the bag rear wall transitions in one piece into the extension portion and/or the extension portion transitions in one piece into the first material strip, forming the closing flap;

or wherein:

the bag front wall is joined directly or via an extension portion to the upper edge portion of the first material strip forming the closing flap, and transitions in one piece into this upper edge portion; and the bag front wall transitions in one piece into the extension portion and/or the extension portion transitions in one piece into the first material strip, forming the closing flap.

5. The bag according to claim 1, wherein:

the bag rear wall is joined over substantially the entire extent between the mutually opposing side edges to the upper edge portion of the first material strip, forming the closing flap, and/or the upper edge portion of the first material strip forming the closing flap is joined over substantially the entire extent between the mutually opposing side edges to the bag rear wall.

6. The bag according to claim 1, wherein:

the bag rear wall is joined via an extension portion to the upper edge portion of the first material strip forming the closing flap, and transitions in one piece into the upper edge portion; or the bag front wall is joined directly or via an extension portion to the upper edge portion of the first material strip forming the closing flap, and transitions in one piece into this upper edge portion;

and wherein:

the extension portion has a punched handle opening, and the first and second portions of the extension portion in each case have a congruent, handle opening.

7. The bag according to claim 3, further comprising:

at least one second material strip that is present at least in places between the first and the second portions of the extension portion, and is joined to the first and second portions of the extension portion.

8. The bag according to claim 3, wherein the bag rear wall is joined to the extension portion and the extension portion transitions, into the first material strip forming the closing flap, and the bag front wall extends via an elongation portion to the other side of the first weld or adhesive bond area between the first and second portions of the extension portion.

9. The bag according to claim 1, wherein the bag front wall, the bag rear wall, and the material strip forming the closing flap are present substantially in one piece.

10. The bag according to claim 1, wherein at least one third weld or adhesive bond area that liquid-tightly joins together the inner sides of the bag front wall and the bag rear wall, and which extends from the first weld or adhesive bond area to the closed lower bag end, forming bag compartments, wherein the bag compartments have the at least one bag opening.

11. The bag according to claim 1, wherein the bag opening constitutes an opening slit with a first and an opposing second end or a cross-shaped slit.

12. The bag according to claim 11, wherein the opening slit has a greater extent than the distance along the rectilinear join between the first and second ends of the opening slit, and this rectilinear join between the first and second ends of the opening slit is a closer distance from the first and/or second weld or adhesive bond area than the opening slit.

13. The bag according to claim 1, wherein the bag is a plastics bag, the bag front wall and the bag rear wall and/or the plastics material strip forming the closing flap, are substantially based on polyolefins or are made therefrom.

14. The bag according to claim 1, further comprising:

at least one detachable protective film covering the adhesion area, wherein the protective film prevents joining of the bag front wall to the closing flap.

15. The bag according to claim 1, wherein the bag front wall and/or the bag rear wall and/or the material strip forming the closing flap are multi-layered, and have two or three layers and/or comprise or constitute a double-layer or multilayer bubble wrap.

16. The bag according to claim 1, wherein the bag constitutes a liquid-tight collection bag, a shipping bag, for damp waste, general cargo waste, comprising used aluminum coffee capsules.

17. The bag according to claim 1, wherein the first weld or adhesive bond area and the second weld or adhesive bond area arise from a simultaneous manufacturing step.

18. The bag according to claim 1, wherein the bag opening extends in a direction from one side edge to the opposing side edge of the bag front wall.

19. The bag according to claim 2, wherein the mutually opposing side edges of the closing flap are brought into a position where they are congruent with the respectively corresponding side edges of the bag front wall.

* * * * *